Patented Nov. 12, 1946

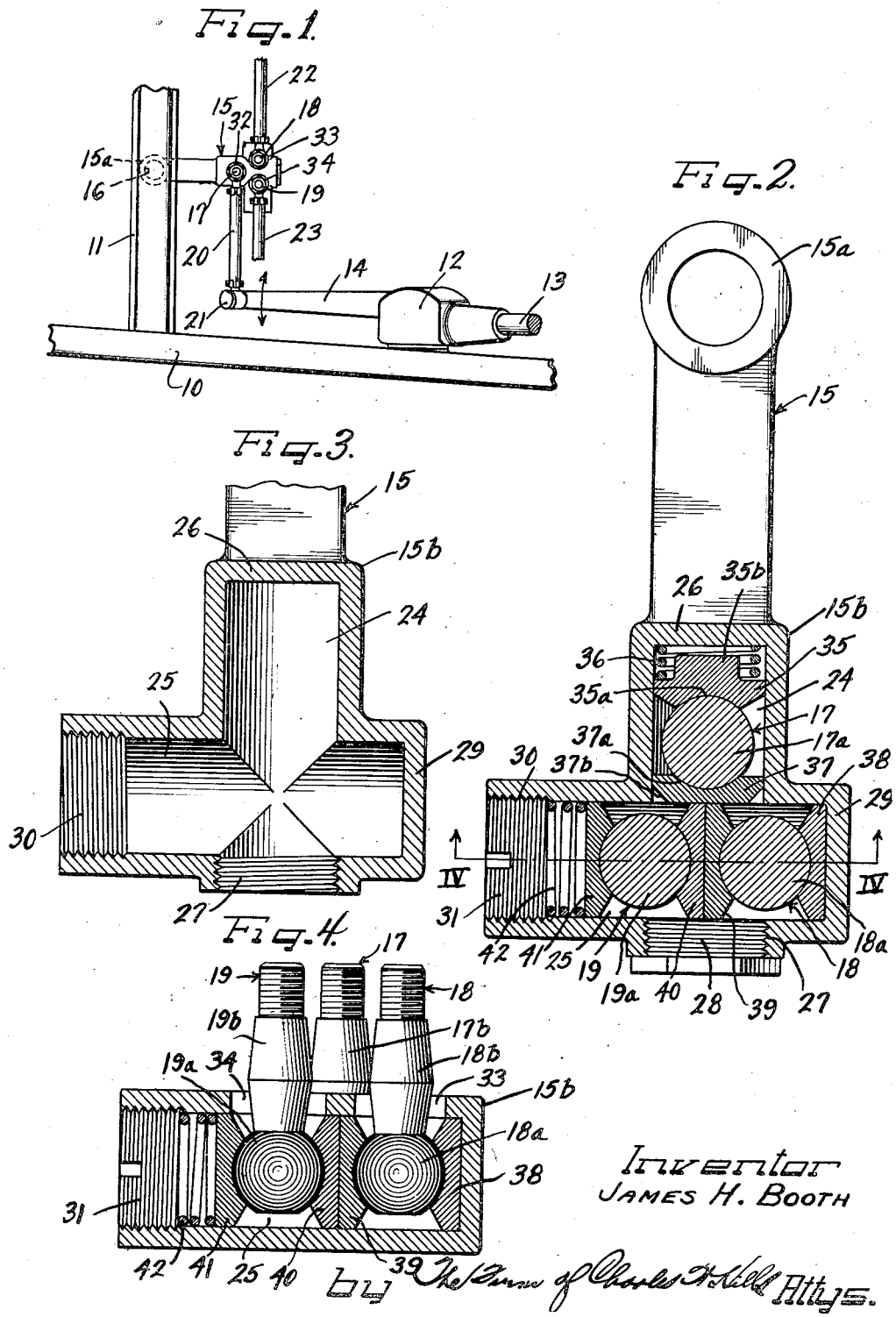

2,411,021

UNITED STATES PATENT OFFICE 2,411,021

STEERING JOINT ASSEMBLY

James H. Booth, Detroit, Mich., assignor to Thompson Products, Inc., Cleveland, Ohio, a corporation of Ohio Application December 8, 1944, Serial No. 567,269

8 Claims. (Cl. 287—90)

This invention relates to steering assemblies, and particularly to center-arm joint constructions for the steering assemblies of independently suspended dirigible wheels.

Automotive vehicle steering assemblies for independently suspended steerable wheels commonly include a center arm pivotally mounted on a part of the automotive vehicle chassis and connected through tie rod joints to the drag link and tie rods. The drag link is actuated by the pitman arm of the steering gear to swing the center arm about its pivot thereby shifting the tie rods and steering the steerable wheels. In such steering assemblies, it is highly desirable to maintain the pivot centers for the drag link and the tie rods as close together as possible so as to avoid errors in the steering geometry for different positions of the assembly.

In accordance with this invention, a center steering arm is now provided for carrying three separate joints in such close relationship that errors in the steering geometry of steering assemblies for independently suspended wheels are minimized.

In accordance with this invention, a center arm member has the free end thereof provided with intersecting bores. These intersecting bores receive seat members for the ball ends of ball studs in such a manner that the ball ends of the studs are positioned very close together and thus, for all practical purposes, operate from a common center.

In the preferred form of the invention, one of the two intersecting bores is parallel with the longitudinal axis of the arm, while the other bore is normal to this one bore. The first bore carries opposed seats for one ball stud. The intersecting bore carries two pairs of ball seats for two ball studs. The ball stud mounted in the first bore is connected to the drag link, while the ball studs mounted in the second bore are connected to the tie rods.

A feature of the invention resides in the use of the seats for the ball ends of the studs to hold each other in proper position in the bores of the housing.

It is, then, an important object of this invention to provide a center steering arm for independent wheel suspensions wherein the drag link and the tie rods of the steering assembly operate from substantially a common center.

A further object of the invention is to provide a steering arm carrying three tie rod joint assemblies in such close relationship that errors in the steering geometry of the assembly are minimized.

A further object of the invention is to provide a ball and socket assembly wherein three ball studs are mounted for universal movement in very closely spaced relationship.

A specific object of the invention is to provide a steering arm with intersecting bores containing ball seats for joint studs which seats cooperate with each other in operative position.

Other and further objects of the invention will be apparent to those skilled in the art from the following detailed description of the annexed sheet of drawings which, by way of preferred example only, illustrates one embodiment of the invention.

On the drawing:

Figure 1 is a fragmentary plan view of a steering assembly embodying a steering arm according to this invention.

Figure 2 is a plan view, with parts in horizontal cross section, of the steering arm of this invention.

Figure 3 is a fragmentary plan view with a portion in horizontal cross section illustrating the intersecting bores of the steering arm of this invention.

Figure 4 is a vertical cross-sectional view, with parts in elevation, taken along the line IV—IV of Figure 2.

As shown on the drawing:

In Figure 1, the reference numeral 10 designates generally one of the longitudinal chassis members of an automotive vehicle while the reference numeral 11 designates a front transverse frame member of the vehicle. A steering gear box 12 is mounted on the frame 10 and a steering shaft 13 projects into the box to operate the gears (not shown) for swinging a pitman arm 14 in a direction shown by the arrows.

The center steering arm 15 of this invention has an eye end 15a pivoted at 16 to the transverse frame member 11. The free end of the arm 15 is enlarged to provide a housing for three studs 17, 18 and 19. The stud 17 is connected through a drag link 20 and ball joint 21 with the pitman arm 14. The stud 18 is connected to a first tie rod 22 while the stud 19 is connected to a second tie rod 23. Swinging of the pitman arm 14 in the direction shown by the arrow will shift the drag link 20 to swing the steering arm 15 about the pivot 16, thereby shifting the tie rods 22 and 23 to steer the wheels (not shown) to which these rods are connected. The studs 17, 18, and 19 are mounted in very close relationship so that they operate almost from a common point and each degree of swinging of the pitman arm 14 will have the same amount of steering effect on the tie rods.

As shown in Figures 2 and 3, the housing portion 15b of the arm 15 has a first bore 24 therein extending longitudinally of the arm and terminating at its inner end at a back wall 26. The other end of the bore 24 has a threaded opening 27 adapted to be closed by means of a closure plug 28.

The second bore 25 intersects the first bore 24 in right angular relationship therewith and has a closed end wall 29 at one end thereof and an open threaded end 30 at the other end thereof adapted to be closed by a screw plug 31.

As shown in Figure 2, the stud 17 has a ball end 17a mounted in the bore 24 and, as shown in Figure 4, this same stud has a shank 17b projecting through an opening 32 (Figure 1) in the top wall of the housing 15b.

As shown in Figures 1, 3 and 4, the studs 18 and 19 have ball ends 18a and 19a respectively seated in the transverse bore 25 together with shank portions 18b and 19b respectively projecting through separate openings 33 and 34 in the top wall of the housing portion 15b.

The openings 32, 33 and 34 are of smaller diameter than the ball ends 17a, 18a and 19a, but of larger diameter than the shanks 17b, 18b, and 19b so that the shanks can be projected freely through the openings while the studs can never fall out of the housing.

A disk 35 is slidably mounted in the bore 24 adjacent the closed end 26 thereof and has a ball seat face 35a urged against the ball end 17a of the stud 17 by a coil spring 36 which is bottomed on the back wall 26 and surrounds a rearwardly projecting lug portion 35b of the seat member.

A second seating disk 37 is slidably mounted in the bore 24 on the opposite side of the ball head 17a and has a ball seating portion 37a receiving the ball. The opposed face of this disk 37 has a beveled or chamfered portion 37b for a purpose to be more fully hereinafter described.

Four ball seating disks 38, 39, 40, and 41 are slidably disposed in the bore 25 with the seat 38 bottomed on the end wall 29 and cooperating with the seat 39 to form a ball socket for the ball end 18a and with the seat 40 bottomed on the seat 39 and cooperating with the seat 41 to form a ball socket for the ball end 19a. A spring 42 acts on the seat 41 and is bottomed on the screw plug 31 to hold the seats in bearing engagement with their respective ball studs.

The ball seat studs are readily mounted in the housing 15b of the arm 15 as follows: The spring 36 is first dropped into the bottom of the bore 24 through the opening 27. The seat 35 is next dropped into the bore to rest on the spring 36. The stud is inserted in the bore 24 with the shank portion foremost, to fall through the opening 32. The seat 37 is next dropped into the bore to rest on the ball 17a of the stud 17.

The seat 38 is next dropped into the bore 25 through the open end 30 thereof. The stud 18 is next inserted in the bore 25 with the shank portion thereof foremost to drop through the opening 33. The seats 39 and 40 are next dropped into the bore 25 in opposed abutting relationship until the seat 39 rests on the ball 18a. The beveled portion 37b of the seat 37 is effective for raising the seat 37 out of the bore 25 when the seats 38, 39 and 40 are being moved into position. When the seats 39 and 40 are seated, they hold the seat 37 out of the bore 25 as shown. The stud 19 is next inserted in the bore 25 and the shank 19b thereof dropped through the opening 34. The seat 41 and spring 42 are next deposited in the bore 25. The closure plug 31 is threaded into the opening 30 to compress the spring 42 as desired. The closure plug 28 is then threaded into the opening 27 to seal the housing.

From the above descriptions it will be clear that this invention provides a center arm for the steering assemblies of independently-suspended wheels wherein the drag link and tie rod connections are so closely spaced that errors in the steering geometry of the assembly are minimized.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A center steering arm for an independent wheel suspension steering assembly which comprises an arm member having an eye on one end thereof and a housing on the other end thereof, said housing having a first bore longitudinally of said arm and a second bore intersecting said first bore transversely of said arm, each of said bores having an open end, a drag link joint assembly mounted in said longitudinal bore, a pair of tie rod joint assemblies mounted in said transverse bore, a spring in each bore maintaining said joint assemblies in operative relation, and closure plugs closing the open ends of said bores.

2. A center steering arm for an independently suspended wheel steering assembly including a drag link and a pair of tie rods which comprises an arm having an eye at one end thereof and a housing at the other end thereof, said housing having intersecting bores in right angular relationship, ball seats in said bores arranged to define ball sockets with a minimum of space therebetween, and ball studs having heads seated in said sockets and shanks projecting from said housing for connection to the drag link and tie rods of the steering assembly.

3. A steering arm comprising a member having a housing portion at one end thereof containing intersecting chambers in right angular relationship, a pair of opposed ball seat members slidably mounted in one of said chambers, two pairs of opposed ball seat members slidably mounted in the other of said chambers, some of the ball seat members in the two chambers being in abutting relation, three ball studs having shanks projecting from said housing portion and ball ends mounted between the pairs of ball seat members in tiltable and rotatable relation therewith, and spring means acting against the ball seat members for maintaining the ball ends and ball seats in good bearing relationship.

4. A joint construction comprising a housing having a first chamber and an intersecting second chamber in right angular relationship therewith, said first chamber having a ball and socket joint mounted therein, said second chamber having two ball and socket joints mounted therein immediately adjacent the joint in the first chamber, and shanks on said studs projecting from said housing.

5. A joint assembly comprising a housing having a first elongated chamber with an opening at one end thereof and a second elongated chamber in right angular intersecting relationship to said first chamber and having an opening at one end thereof, a spring in the bottom of said first chamber, a first ball seat bottomed on said spring, a second ball seat in said first chamber in spaced opposed relationship to said first ball seat, a first stud having a ball end between said first and second seats in bearing engagement therewith together with a shank portion projecting from said chamber, said second ball seat having a beveled periphery, a third ball seat bottomed in the end of said second chamber, a fourth ball seat in said second chamber in spaced opposed relation from said third seat, a second stud having a ball end between said third and fourth ball seats in bearing engagement with said seats, a fifth ball seat in said second chamber abutting said fourth ball seat, a sixth ball seat in said second chamber in spaced opposed relation from said fifth seat, a third stud having a ball end between said fifth and sixth ball seats in bearing engagement therewith, said fourth and fifth ball seats thrusting against said second ball seat and the beveled portion of said second ball seat being effective to force the second ball seat into the first chamber when engaged by the ball seats in the second chamber, a spring acting against the sixth ball seat to hold the ball seats against the ball ends of the second and third studs, and plugs closing the open ends of the first and second chambers.

6. A joint assembly comprising a housing having intersecting chambers in angular relationship, pairs of ball seats slidably mounted in said chambers, some of the ball seats in the intersecting chambers being in abutting relationship, and ball studs having ball ends between the pairs of ball seats in bearing engagement therewith.

7. A steering arm comprising an arm member having a housing at one end thereof with intersecting chambers, pairs of ball seats slidably mounted in said chambers, ball studs having ball ends disposed between the pairs of ball seats in bearing engagement therewith, and springs in said chambers acting on said ball seats to maintain the seats in good bearing relation with the ball ends of the studs, a ball seat of one chamber being held in said chamber by a ball seat of another chamber whereby the ball studs are disposed in closely adjacent relationship.

8. A center steering arm for a steering assembly comprising a housing having first and second intersecting bores in angular relationship, a pair of spaced opposed ball seats slidably mounted in said first bore, two pairs of spaced opposed ball seats slidably mounted in said second bore, and studs having ball ends mounted on said ball seats together with shanks extending freely through the housing from said ball ends, said studs being disposed in closely spaced relationship and having limited universal movement relative to the housing.

JAMES H. BOOTH.